United States Patent [19]
Sandy, Jr. et al.

[11] Patent Number: 4,938,272
[45] Date of Patent: Jul. 3, 1990

[54] VALVE ACTUATOR FOR TIRE PRESSURE MANAGEMENT

[75] Inventors: William M. Sandy, Jr., Seven Hills; Donald L. Williams, Port Clinton, both of Ohio

[73] Assignee: General Motors Corporation, Detroit, Mich.

[21] Appl. No.: 301,765

[22] Filed: Jan. 26, 1989

[51] Int. Cl.$^5$ .......................... B60C 23/00; F16K 7/17
[52] U.S. Cl. ...................................... 152/427; 152/416; 137/225; 251/61.2
[58] Field of Search ............... 152/415, 416, 417, 418, 152/427, 429; 137/223, 224, 225; 251/61.2, 61.3, 61.5

[56] References Cited

U.S. PATENT DOCUMENTS

| | | | |
|---|---|---|---|
| 2,141,542 | 12/1938 | Mann, Jr. | 152/418 |
| 2,685,906 | 8/1954 | Williams | 152/417 |
| 2,939,504 | 6/1960 | Bedford, Jr. | 152/418 |
| 2,976,906 | 3/1961 | Kamm et al. | 152/417 |
| 3,099,309 | 7/1963 | Congost Horta et al. | 152/416 |
| 3,249,144 | 9/1964 | Dobrikin | 152/415 |
| 3,908,105 | 9/1975 | Schuler | 200/61.25 |
| 4,335,283 | 6/1982 | Migrin | 200/61.25 |
| 4,620,500 | 11/1986 | Condon | 239/71 X |
| 4,696,334 | 9/1987 | Le Chatelier | 152/415 |

Primary Examiner—Robert A. Dawson
Assistant Examiner—Gregory J. Wilber
Attorney, Agent, or Firm—Patrick M. Griffin

[57] ABSTRACT

A pneumatic check valve actuator assembly for a tire pressure management system uses a snap action disk to provide quick and positive on-off response.

1 Claim, 2 Drawing Sheets

VALVE ACTUATOR FOR TIRE PRESSURE MANAGEMENT

Background of the Invention

Vehicle tire pressure management systems, although they have yet to find wide commercial acceptance, are widely covered in the literature, especially in published patents. Some systems do no more than monitor tire pressure with various sensors and signals, warning the driver when tire pressure has fallen outside of acceptable limits. Others go further, not only sensing tire pressure, but actively maintaining it, either automatically, or in response to a specific driver command. The most complete active systems also provide a means for decreasing tire pressure, either in response to a temperature increase, or to adapt the tires to run in softer surfaces. Active systems have the potential both for increased convenience, by handling slow tire leaks, and for improved drivability and gas mileage. Active systems must provide some kind of air pressure source, typically a compressor that is battery or engine driven, and a system of supply lines, pressure sensors, and associated controls that sense tire pressure and feed the pressurized air out to the tires.

Every active system must have a valve actuator that is the direct interface between the tire itself and the system, opening and closing to the tire interior in response to a command. While electronic valves can provide almost any desired sequence of opening and closing, they are expensive. The most practical valve actuator for such a system is one that is purely pneumatic, and which is operated solely by the same compressor supplied air pressure that also acts to fill the tire. Even more practical is a valve actuator assembly that acts to open and close the same kind of spring loaded check valve that can typically be found in tire stems, generally known as Schrader valves. These are widely available and have a proven effectiveness. Such valves, of course, are only as effective as the actuator that opens or closes them.

Known pneumatic actuators for opening a Schrader valve typically use a differential piston or diaphragm with a return spring. This allows a single pressure to be supplied to the piston, which, given an area differential between the ends of the piston, gives an unbalanced force to axially shift it in one direction and open the Schrader valve. When the pressure is bled off, the return spring takes the piston back, allowing the Schrader valve to close. There are shortcomings to such a design. Since a piston slides linearly or continuously, a fairly high pressure has to be supplied to it in order for it to move quickly. Even more important is that the valve close quickly and completely, so that minimal air will be lost from the tire. In order for the piston to move back quickly, a strong return spring is necessary, which, of course, detracts from quick opening, as its force has to be overcome.

Summary of the Invention

The invention provides a quicker acting valve actuator assembly, which is also simple and is characterized by a high degree of cooperation between a small number of components. Instead of a linearly sliding piston or diaphragm with a return spring, the assembly of the invention uses a dimpling disk as the actuator. The disk acts quickly to provide a very positive on-off action, and also cooperates structurally with the rest of the assembly to provide various necessary chambers and seals.

The preferred embodiment of the valve actuator assembly disclosed is used in a vehicle tire pressure management system that can supply a selected air pressure, on command, from a compressor of the like. A generally cylindrical housing has an inlet at one end that receives the air pressure from the compressor and an outlet at the other end that opens through the tire rim into the interior of the tire. A Schrader type check valve is located in the outlet, with its pin pointing toward the inlet, so that it will open and close the outlet when it is opened and closed. The dimpling disk, which is a round disk of thin metal, is convex in its free, unstressed state, but when a sufficient pressure is applied, it quickly snaps or "dimples" to a concave shape. It does not over center in the sense that it is stable, however, but remains stressed, and will return quickly when the pressure is removed. The disk is fixed inside the housing with its perimeter edge sealed, and in an orientation where its free state, convex side faces the inlet, thereby forming a signal chamber. Since the perimeter of the disk is sealed, its other side is isolated from any air pressure in the signal chamber.

Mounted in the center of the disk is a hollow, closed end plunger shaft with a port near its end, which, in the free state of the disk, is slightly spaced from the valve pin. The plunger shaft is closely slidably received through a plastic plug that is threaded air tight into the housing between the check valve and the disk. The plug therefore forms both a feed chamber between one its sides and the check valve, and an expansion and contraction chamber between its other side and the disk. While the plunger shaft slides easily through the plug, it fits closely enough that very little air can migrate through the plug to the expansion and contraction chamber. However, in the embodiment disclosed, the expansion and contraction chamber is also vented to atmosphere.

In operation, sufficient pressure is provided to the signal chamber to dimple the disk, which moves the plunger shaft through the plug far enough to open the check valve. Pressurized air can then flow from the signal chamber, through the conduit provided by the hollow plunger shaft to the feed chamber and into the tire, or vice versa. Since the expansion and contraction chamber is well isolated from the signal chamber, and substantially isolated from the feed chamber, the disk can dimple in quickly and with little resistance. Any pressure that does leak in is vented to atmosphere. When the air pressure is bled out of the signal chamber, the disk dimples quickly back from its stressed to its free state, allowing the check valve to close positively.

It is, therefore, an object of the invention to provide a simple and quick acting valve actuator assembly for a vehicle tire pressure management system.

It is another object of the invention to provide such an assembly in which the quick valve opening action is provided by the snap action of a dimpling disk.

It is another object of the invention to provide such an assembly in which the disk that provides the snap action also cooperates with other structure to provide various chambers and seals, thereby minimizing the number of components.

Description of the Preferred Embodiment

These and other objects and features of the invention will appear from the following written description, and from the drawings, in which.

Figure 1:
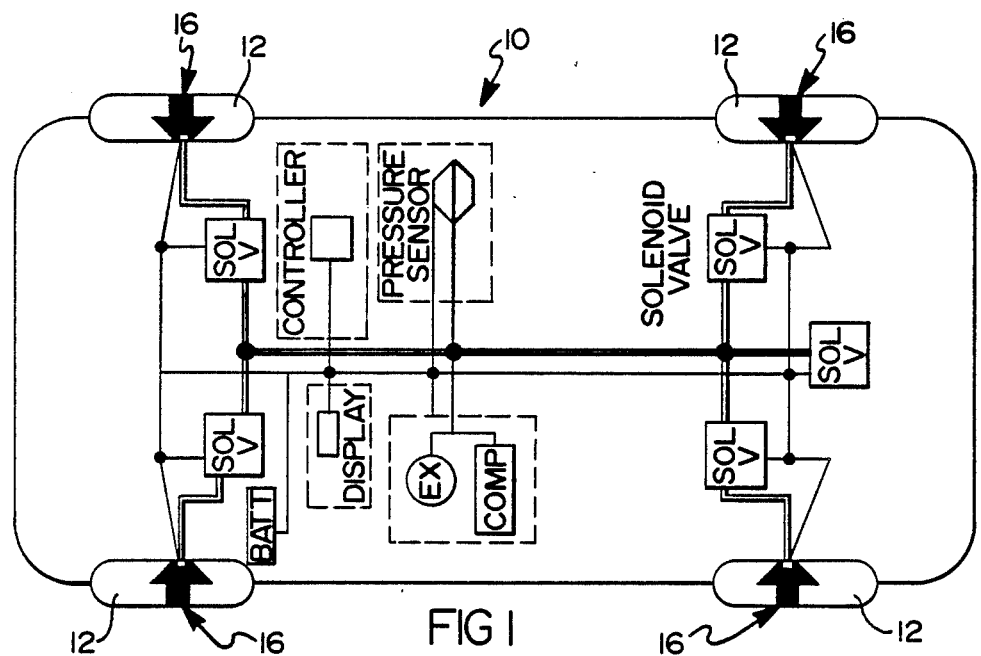
FIG. 1 is a schematic of a tire pressure management system.
Figure 2:
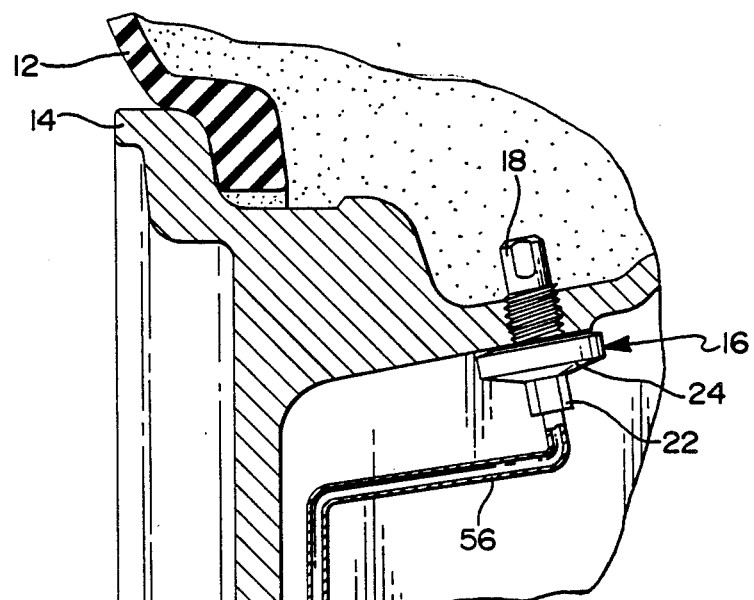
FIG. 2 is a cross section through part of a tire and tire rim showing a preferred embodiment of the invention in elevation.

Referring first to FIG. 1 and 2, a vehicle tire pressure management system is shown schematically and indicated generally at 10. Such a system 10 serves, in general, to manage the pressure of each of the four tires 12, each of which is the tubeless type with a rim 14. The exact details of such a system, which may vary widely, are not important to an understanding of the invention. Any such system will have a compressor or other source of pressurized air, and various solenoid valves, sensors, and feed lines to each tire 12. Whatever its exact details, the last link in the management system 10 must be some kind of valve actuator assembly that provides on and off access to the interior of tire 12, in order to sample its pressure, or provide a path in or out for pressurized air, as necessary. Here, there is one such valve actuator assembly, indicated generally at 16, mounted to each rim 14, the details of which are described below.

Figure 3:
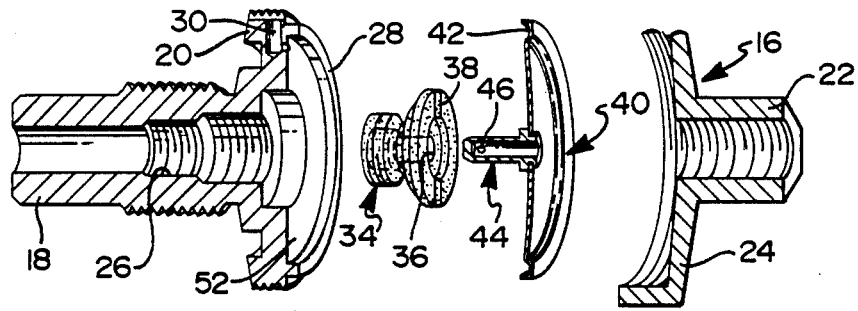
FIG. 3 is an exploded view of the valve actuator assembly of the invention showing most of the parts in section.
Figure 4:
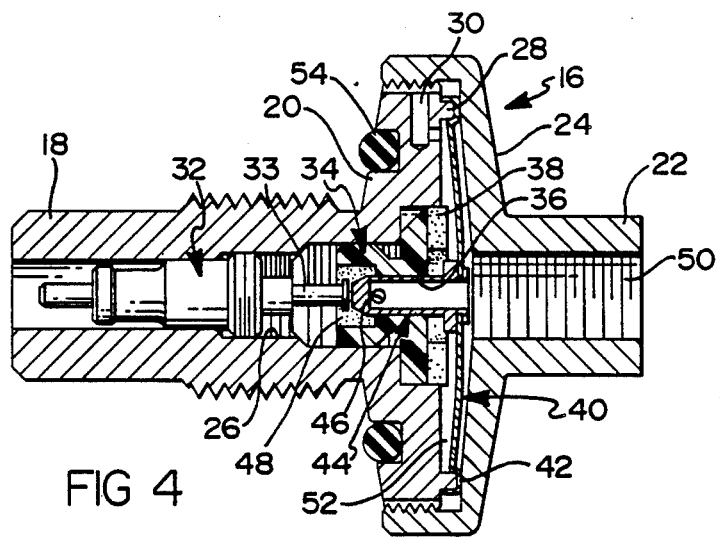
FIG. 4 is view of the assembly of the invention removed from the tire and in the closed position, showing everything in cross section but for the check valve.

Referring next to FIGS. 3 and 4, the various parts of the assembly 16 of the invention may be seen. The basic structural framework of the preferred embodiment is a two piece cylindrical housing of aluminum, including a base comprised of an externally threaded hollow stem 18 and an externally threaded circular flange 20, and a cap comprised of an internally threaded inlet tube 22 and an internally threaded skirt 24. Skirt 24 is sized so as to thread over the edge of flange 20. Stem 18 also has a stepped internally threaded bore 26 and flange 20 has a raised circular lip 28. A cross drilled vent passage 30 opens through the edge of flange 20 and also open inboard of the raised lip 28, for a purpose described below. A spring loaded check valve 32 of the type known as a Schrader valve, which has a spring returned operating pin 33, is sized so as to thread into the lowermost part of stem bore 26. An externally threaded plastic or nylon plug 34 is sized so as to thread into base bore 26 above valve 32. Plug 34 has a central passage 36 and a slot 38 cut diametrically across it. A round disk 40 formed of thin bronze has a slightly curved, convex shape with an inwardly bent perimeter edge 42. From its free state shape, disk 40 will deform or "dimple" to a stressed, concave shape if a sufficient pressure is applied to it. Finally, riveted through the center of disk 40 is a hollow plunger shaft 44 with a closed lower end and an exit port 46 on the side near the lower end. Shaft 44 is sized so as to fit slidably and closely through plug passage 36.

Referring next to FIGS. 2 and 4, the assembly 16 is built up by first threading check valve 32 into base bore 26. Valve 32 acts to block or unblock the outlet provided by the end of base 18, just as it would do in a tire stem, and is normally spring loaded closed. Next, plastic plug 34 is threaded into base bore 26 by a suitable driving tool in slot 38 as far as it will go, thereby forming a feed chamber 48 between its underside and the check valve 32. Feed chamber 48 is sealed and airtight, when valve 32 is closed, but for the plug passage 36. Next, the disk 40-plunger shaft 44 unit is dropped in place, as plunger shaft 44 is inserted through plug passage 36. Then, skirt 24 is threaded down tight onto flange 20, thereby tightly clamping the disk perimeter edge 42 between flange lip 28 and the underside of skirt 24. This forms two more chambers, a signal inlet chamber 50 between the free state convex side of disk 40 and inlet tube 22, and an expansion and contraction chamber 52 between the opposite side of disk 40 and the upper side of plug 34. While the assembly 16 is basically complete at this point, an 0-ring 54 can be added to the underside of flange 20, if desired. When assembly 16 is complete, the lower end of plunger shaft 44 is slightly spaced from check valve pin 33, and, if sufficient pressure is applied to disk 40 to dimple it to its stressed state, it will move plunger shaft 44 far enough through plug passage 36 to move pin 33 far enough to open check valve 32. What that sufficient pressure will be will depend basically only upon the stiffness of disk 40 and the spring force of check valve 32, as there is very little resistance to plunger shaft 44 sliding through plug passage 36. Finally, stem 18 is threaded through tire rim 14, compressing 0-ring 54, and an air supply line 56 from system 10 is threaded into inlet tube 22. The few components may all be easily removed and replaced. Assembly 16 operates as described next.

Figure 5:
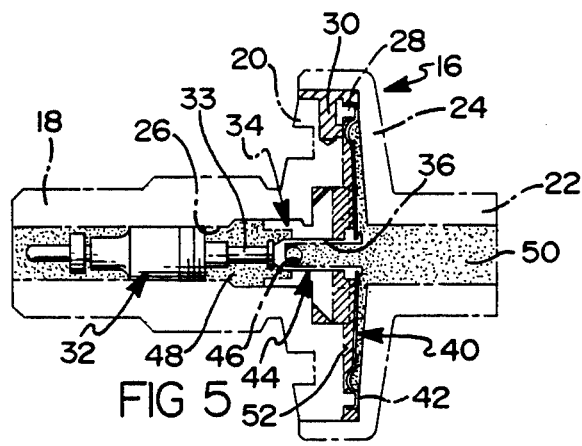
FIG. 5 is a simplified view similar to FIG. 4, but showing the valve open, and indicating the various pressures in the chambers by shading.

Referring next to FIGS. 4 and 5, when the sufficient pressure described above is supplied through supply line 56 to signal chamber 50, disk 40 moves to its convex, stressed state, opening check valve 32 as its underside moves against the upper side of plug 34, as seen in FIG. 5. This happens quickly, with a snap action, unlike the continuous sliding motion of a differential piston or diaphragm. Then, a clear path is established from the interior of tire 12, through check valve 32 to feed chamber 48, through hollow plunger shaft 44 and its port 46, to signal chamber 50 and ultimately to supply line 56, which are then all at the same pressure, as shown by the stippling in FIG. 5. The expansion and contraction chamber 52 stays at atmospheric pressure, as shown by the different shading. At that point, the pressure of tire 12 can be sampled. Depending of the reading, the pressure supplied to signal chamber 50 may be increased, in order to add air quickly to tire 12, or may be left as is, and an exhaust valve farther upstream in the system opened to let air out. Ideally, the sufficient pressure necessary to just hold disk 40 down, which might also be termed the command pressure or opening pressure, would be less than the lowest desired pressure in tire 12, giving the maximum differential possible for exhausting air from tire 12 quickly, if desired. The stiffness of disk 40 would be so chosen. When the pressure is exhausted quickly from signal chamber 50, disk 40 quickly snaps back to its FIG. 4 free state, and, just as quickly, check valve 32 shuts. The normal slight spacing between pin 33 and the end of plunger shaft 44 assures complete shut off of valve 32.

Having described the assembly and operation of the invention, the high degree of cooperation between the various components may be seen. Disk 40, in addition to acting more quickly and positively than a piston, serves as both the actuator of valve 32 and as its own return spring to pull shaft 44 back up, eliminating the need for a separate return spring. Check valve 32, being spring loaded itself, assists in returning disk 40 to its free state when it springs shut. Disk 40, being essentially planar and continuous, can form both the signal chamber 50 and the expansion and contraction chamber 52, and the tight clamping of its edge 42, by preventing pressurized air from leaking into expansion and contraction chamber 52, helps assure that disk 40 meets little resistance when it snaps down. Disk 40 also provides a convenient mount for plunger shaft 40, which is riveted to its center, the portion that moves to the greatest degree when it snaps down. Being hollow, plunger shaft 44 provides a convenient and direct conduit between signal chamber 50 and feed chamber 48. Plastic plug 34, in addition to dividing the feed chamber 48 from expansion and contraction chamber 52, also provides a low friction bearing and guide for plunger shaft 44 because of the close fit within passage 36. That same closeness of fit retards air leakage, but if any pressurized air should leak along shaft 44 into expansion and contraction chamber 52, it will vent to atmosphere through the vent passage 30. And, even if the underside of disk 40 should snap down closely against plug 34, the slot 38 used to thread it in place assures an uninterrupted air flow path. Thus, it can be seen that essentially all of the components, though few in number, serve several functions. Tolerances are not severe, as shaft 44 is normally spaced away from pin 33, the seal at disk edge 42 is easily formed by tightening skirt 22, without affecting any other components, and plug 34 does not have to be positioned absolutely accurately axially within bore 26 in order to prevent air migration between shaft 44 and plug passage 36.

Variations of the preferred embodiment may be made. The plug 34 and closely slidable shaft 44 could be replaced by a plunger assembly that was sealed more positively, such as by a flexible bellows. Such a bellows seal could seal tightly enough that the vent passage 30 could be eliminated, although it are not difficult to provide, since the entire underside of the flange 20 does not sit down tight against the rim 14. An alternative plunger assembly could be physically separate from disk 40, using its own return spring, or getting all of its return function from the spring loaded check valve 32. Shaft 44 could be solid, and an alternative conduit could be provided from signal chamber 50 to feed chamber 48. Thus, it will be understood that the invention is not intended to be limited to just the preferred embodiment described.

The embodiments of the invention in which an exclusive property of privilege is claimed are defined as follows:

1. A valve actuator assembly for a vehicle tire pressure management system of the type that can provide a selected air pressure, said valve actuator assembly comprising, a housing having an inlet adapted to receive said air pressure and an outlet adapted to open to at least one of said vehicle tires, a pressure check valve located in said outlet so as to open and close said outlet, a dimpling disk that moves quickly between a stable, convex free state and a non stable, concave stressed state when a sufficient command pressure is applied thereto and maintained, and which returns automatically and without assistance to the free state when said command pressure is removed, said disk being sealingly fixed within said housing between said inlet and check valve so as to create a signal chamber between the free state convex side of said disk and said inlet and to isolate the opposite side of said disk from said inlet, a plunger assembly sealingly fixed within said housing between said check valve and said disk so as to create both a feed chamber between said check valve and plunger assembly and an expansion and contraction chamber between said plunger assembly and said disk opposite side that is isolated from said feed chamber, said plunger assembly also having a plunger with one end engageable with said disk and the other end engageable with said check valve so as to open and close said outlet as said disk moves between said free state and said stressed state, and a conduit by-passing said expansion and contraction chamber and communicating between said signal and feed chambers, whereby, when said command pressure is supplied to said signal chamber, said disk will move from said free state to said stressed state quickly and substantially without restriction, by virtue of said isolated expansion and contraction chamber, thereby opening said check valve and allowing air pressure to flow freely between said signal and feed chambers, and when said command pressure is removed from said signal chamber, said disk will quickly self return to its free state, allowing said check valve to close.

* * * * *